A. E. WALDEN.
FUEL SUPPLY CONTROL MECHANISM.
APPLICATION FILED FEB. 7, 1920.

1,395,212. Patented Oct. 25, 1921.
2 SHEETS—SHEET 1.

Inventor
Alfred E. Walden

By
Attorneys

A. E. WALDEN.
FUEL SUPPLY CONTROL MECHANISM.
APPLICATION FILED FEB. 7, 1920.

1,395,212.

Patented Oct. 25, 1921.
2 SHEETS—SHEET 2.

Inventor
Alfred E. Walden

By Whittemore Hulbert Whittemore
Attorney

UNITED STATES PATENT OFFICE.

ALFRED E. WALDEN, OF DETROIT, MICHIGAN.

FUEL-SUPPLY-CONTROL MECHANISM.

1,395,212.   Specification of Letters Patent.   Patented Oct. 25, 1921.

Application filed February 7, 1920. Serial No. 356,991.

*To all whom it may concern:*

Be it known that I, ALFRED E. WALDEN, a citizen of the United States of America, residing at Detroit, in the county of Wayne and State of Michigan, have invented certain new and useful Improvements in Fuel-Supply-Control Mechanism, of which the following is a specification, reference being had therein to the accompanying drawings.

The invention relates to fuel supply control systems in which liquid fuel is transferred from the main tank on a vehicle to an auxiliary tank by means of vacuum. One object of the invention is to provide a strong substantial construction which comprises but few moving parts, and which will stand up under hard usage, as when being used upon a truck or tractor where there is considerable vibration. Another object is the provision of a construction having a movable member controlling the communication of the fuel receiving compartment of the auxiliary tank with air at atmosphere pressure or with a source of vacuum and a second movable member controlling the movement of the first member and actuated by the float in the receiving compartment. Other objects of the invention reside in the novel arrangements and combinations of parts as more fully hereinafter set forth.

Figure 1:
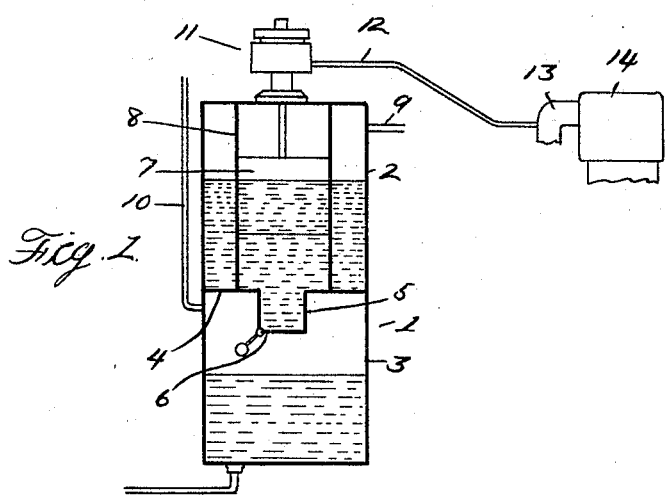
Figure 1 is a diagrammatic view showing the fuel supply system embodying my invention.

As shown in Fig. 1 the fuel supply system comprises the auxiliary tank 1 having the upper and lower compartments 2 and 3 respectively, which are separated by the horizontal partition 4 having the centrally located well 5 at the lower end of which is pivotally mounted the balanced valve 6 adapted to close the passageway through the well. 7 is a float adapted to move vertically within the upper compartment 2, suitable guides 8 being provided for the float. 9 is the liquid fuel inlet into the upper compartment 2, this inlet being connected to the main tank upon the vehicle for the liquid fuel, and 10 is a pipe connecting into the upper end of the lower compartment 3, the upper end of this pipe extending above the top of the upper compartment 2 and being open for the purpose of providing atmospheric pressure in the lower compartment 3 at all times. 11 is the fuel supply control mechanism which is adapted to be operated by the float 7 and has the conduit 12 suitably connected into the intake manifold 13 of an internal combustion engine 14.

Figure 2:
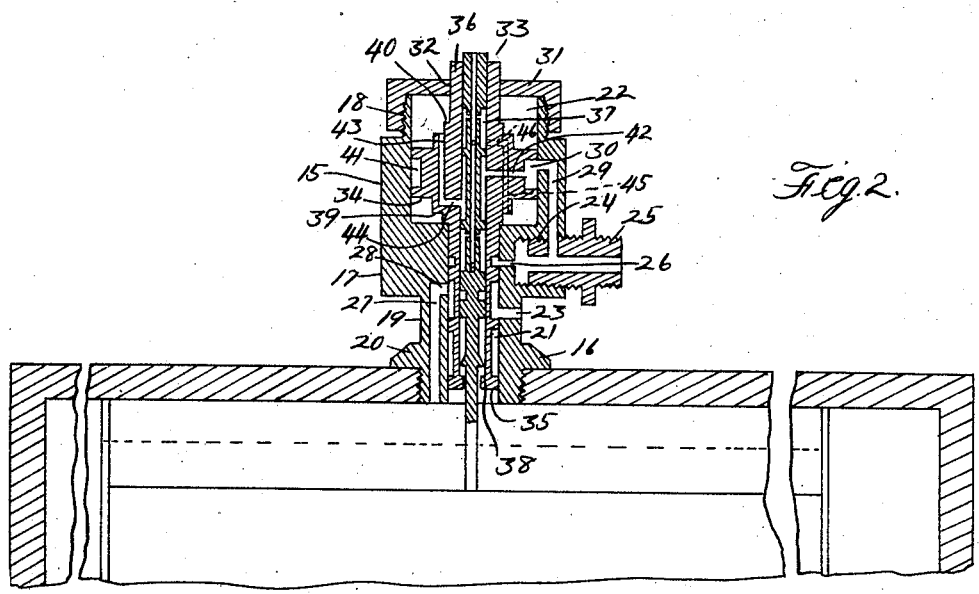
Fig. 2 is a vertical central cross section through the fuel supply control mechanism and the upper portion of the tank.
Figure 3:
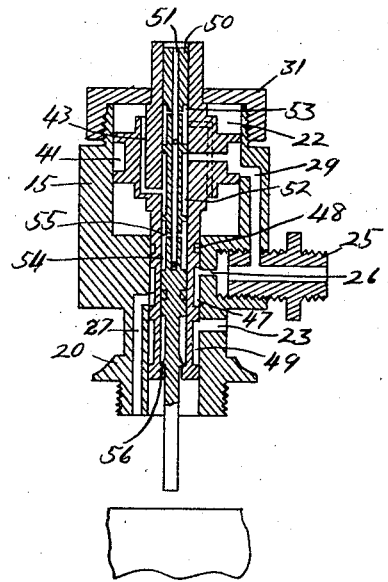
Figs. 3 and 4 are similar views showing different positions of the parts of the fuel supply control mechanism.
Figure 4:
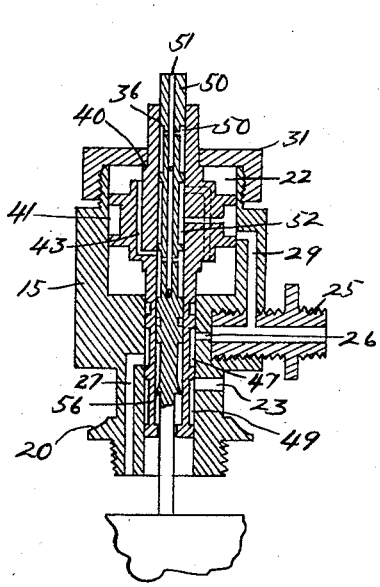

Referring to Figs. 2, 3 and 4, the fuel supply control mechanism comprises the casing 15 which has the nipple 16 for threadedly engaging in the upper end or top of the upper compartment 2, the body 17, the upper end 18 of which is threaded, and the intermediate neck 19, which has the hexagonal enlargement 20. The lower part of the body 17 and the neck and nipple have the axial bore 21, while the upper part of the body 17 has the enlarged axial bore 22. The neck 19 has the transversely extending aperture 23 connecting into the bore 21 and adapted for the passage of air at atmospheric pressure. The lower part of the body 17 has the transversely-extending threaded recess 24, which is engaged in by the nipple 25 adapted for connection with the conduit 12 leading into the intake manifold 13. Extending axially inward from the inner end of the recess 24 and communicating with the bore 21 is the passageway 26. 27 is a passageway extending longitudinally through the nipple 16 and neck 19, and having the lateral bend 28 connecting into the bore 21 intermediate the passageways 23 and 26, the arrangement being such that the passageway 27 does not directly communicate with either of said other passageways. The upper part of the body 17 has the longitudinally extending passageway 29 which communicates with the interior of the threaded nipple 25 and has the lateral bend 30 connecting into the enlarged bore 22.

31 is a cap threadedly engaging the upper end 18 of the body and having the axial bore 32.

33 is the main valve longitudinally movable in the bores 21 and 22, this valve comprising the piston 34, the lower stem 35 and the upper stem 36, the latter having a sliding fit in the aperture 32 of the cap 31. The main valve has the axial bore 37 extending completely therethrough, the lower end being of slightly less diameter, so that the annular shoulder 38 is formed therein.

The piston 34 has the lower and upper shoulders 39 and 40, respectively, which are adapted to respectively engage the lower end of the enlarged bore 22 and the lower face of the cap 31 upon movement of the main valve. The piston has the centrally located annular recess or channel 41 in its periphery, which is of a width sufficient that it is in communication with the lateral bend 30 of the passageway 29 under all positions of the main valve. 42 is a radially-extending passageway connecting into the channel or recess 41 and the axial bore 37. 43 is a longitudinally-extending passageway in the piston having its upper end opening into the enlarged bore 22 below the shoulder 40 and above the enlarged part of the piston, and the lateral bend 44 at its lower end connecting into the axial bore 37. 45 is still another longitudinal passageway having its lower end opening into the enlarged bore 22 above the shoulder 39 and below the enlarged part of the piston, and upper end of this passageway having the lateral bend 46 connecting into the axial bore 37.

The lower stem 35 of the main valve has the centrally located annular channel or recess 47 in its periphery which is of a width such that it is adapted to either connect the passageways 23 and 27 or the passageways 26 and 27, depending upon the position of the main valve. The lower stem also has the upper and lower annular channels or recesses 48 and 49, respectively, in its outer periphery, which are respectively adapted to communicate with the passageway 26 and the passageway 23 when said passageways are not connected with the annular channel or recess 47 in order to equalize the air pressure upon all sides of the lower stem. 50 is the inner valve, slidably engaging in axial bore 37 of the main valve. The upper half of this inner valve has the axial bore 51, the upper end of which communicates with the atmosphere. The lower end of this valve is adapted to be engaged by the float 7 and be actuated thereby. The upper half of this inner valve has the centrally located annular channel or recess 52 in its periphery, which is of a width such that it at all times is in communication with the passageway 42 in the enlarged part of the piston 34. 53 and 54 are, respectively, upper and lower annular channels or recesses in the periphery of the inner valve, these channels being at all times in communication with the axial bore 51 by means of the apertures 55. 56 are shoulders which are located substantially centrally of the lower half of the inner valve 50 and are adapted to engage the shoulders 38 upon the main valve 33.

In operation, assuming the parts to be in the position as shown in Fig. 2 when the liquid fuel in the upper compartment 2 has been emptied in the lower compartment 3, it is noted that the interior of the compartment 2 is subjected to atmospheric pressure due to the fact that the passageway 23 is in communication with the passageway 27 through the annular channel or recess 47. Also the part of the enlarged bore 22 above the piston 34 and below the cap 31 is subjected to pressure less than atmospheric pressure, due to the fact that the passageway 43 communicates with the passageway 29 by means of the annular channel or recess 52 in the inner valve 50 and the lateral passageway 42 and the annular channel or recess 41 in the piston 34. The passageway 29 is at all times in communication with the intake manifold 13 through the threaded nipple 25 and conduit 12.

Furthermore, the part of the enlarged bore 22 beneath the piston 34 is subjected to atmospheric pressure due to the fact that the passageway 45 is in communication with the axial bore 51 in the inner valve 50 through the upper annular channel or recess 53 and bores 55.

Under these conditions the main valve 33 is automatically raised until the upper shoulder 40 upon the piston engages in cap 31, as shown in Fig. 3. The raising of the main piston also raises the inner auxiliary valve 50 due to the fact that the shoulders 56 upon the latter are engaged by the shoulders 38 upon the former. The arrangement of the passageways and annular channel or recess in the upper parts of both the main and inner or auxiliary valve is such that the part of the enlarged bore 22 above the piston 34 is still subjected to pressure less than atmospheric, while the part of the enlarged bore below the piston is still subjected to atmospheric. The interior of the compartment 2, instead of being subjected to atmospheric pressure is now subjected to pressure less than atmospheric, due to the fact that the centrally located annular channel or recess 47 upon the main valve 33 now places the passageway 27 in communication with the passageway 26, which in turn is in communication with the interior of the threaded nipple 25. The interior of the compartment 2 being under suction, the liquid fuel is drawn from the main tank of the vehicle through the inlet 9 into the compartment 2 and this fuel gradually raises the float 7, the top of which engages the lower end of the inner or auxiliary valve 50 and raises the same until it reaches the position as shown in Fig. 4.

When the parts are in their positions as indicated in Fig. 4, the part of the enlarged bore 22 above the piston 34 is subjected to atmospheric pressure, due to the fact that the passageway 43 is now in communication with the axial bore 51 in the inner or auxiliary valve through the lower annular channel or recess 54 of the inner or auxiliary valve into apertures 55. The part of the enlarged bore 22 below the piston is subjected to pressure less than atmospheric, due to the fact that the annular channel or recess 52 upon the inner or auxiliary valve connects the passageway 45 with the lateral passageway 42 and annular channel or recess 41 of the piston 34. This annular channel or recess communicates with the passageway 29 connecting into the interior of the threaded nipple 25. As soon as the parts assume this relation the main valve 33 returns to its lowermost or original position, as shown in Fig. 2, when the interior of the tank 2 is again placed under atmospheric pressure through the passageway 27, annular channel or recess 47 and passageway 23. The liquid fuel in the upper compartment 2 is then automatically dumped into the lower compartment 3, which allows the float 7 to resume its original position where the portion of the enlarged bore 22 above the piston 34 is again subjected to vacuum and the portion of the enlarged bore below the piston is subjected to atmospheric pressure (as shown in Fig. 2).

What I claim as my invention is:

1. In a fuel supply control system, the combination with a compartment adapted to receive liquid fuel, and a float therein, of a valve movable to place the interior of said compartment under atmospheric pressure or under pressure lower than atmospheric pressure, and a second valve engageable with and operated by said float for controlling the movement of said first-mentioned valve.

2. In a fuel supply control system, the combination with a compartment adapted to receive liquid fuel, and a float therein, of a body upon said compartment, a movable valve within said body for placing the interior of said compartment under atmospheric pressure or sub-atmospheric pressure, and a second movable valve within said first mentioned valve for controlling the movement of the same, said second valve being actuated by said float.

3. In a fuel supply control system, the combination with a compartment adapted to receive liquid fuel, and a float therein, of a casing upon said compartment, a valve longitudinally slidably movable in said casing to place the interior of said compartment under atmospheric or sub-atmospheric pressures, a piston upon said valve, and an inner valve longitudinally slidably engaging within said first-mentioned valve and actuated by said float, said inner valve being provided with means for alternately placing opposite sides of said piston under atmospheric and sub-atmospheric pressures.

4. In a fuel supply control system, the combination with a compartment for receiving liquid fuel, and a float therein, of a casing provided with a passageway adapted for air at a pressure lower than atmospheric pressure, and a second passageway adapted for air at atmospheric pressure of a valve within said casing and movable longitudinally thereof provided with means for connecting the interior of said compartment with either of said passageways, and a second valve within said first-mentioned valve and movable longitudinally thereof, said second valve being actuated by said float to control the movement of said first-mentioned valve.

5. In a fuel supply control mechanism, the combination with a casing having a bore extending longitudinally therethrough, a transverse passageway for air under atmospheric pressure extending from the outer surface of said casing to said bore, a second transverse passageway connecting into said bore at a spaced point from said first passageway, a third passageway extending from the lower end of said casing into said bore and a fourth passageway connecting into said bore at still another spaced point, said second and fourth pasageways adapted to be connected to a source of vacuum, of a valve movable longitudinally in said bore and provided with means for connecting either of said two first-mentioned passageways to said third passageway, said valve having a bore extending longitudinally therethrough, and a piston with a transverse passageway in communication with said fourth passageway at all times and connecting into said last mentioned bore, and passageways from said last-mentioned bore communicating with said first-mentioned bore on opposite sides of said piston and a second valve in said last-mentioned bore movable to connect said transverse passageway in said piston with either of said last-mentioned passageways in said piston.

6. In a fuel supply control system, the combination with a compartment adapted to receive liquid fuel and a float therein, of a valve movable to place the interior of said compartment under atmospheric pressure or under pressure lower than atmospheric pressure, and a second valve operated by said float for controlling the movement of said first-mentioned valve.

In testimony whereof I affix my signature.

ALFRED E. WALDEN.